UNITED STATES PATENT OFFICE.

GARDNER HEWETT, OF NEW YORK, N. Y.

DEPOLARIZER FOR VOLTAIC CELLS.

SPECIFICATION forming part of Letters Patent No. 512,510, dated January 9, 1894.

Application filed April 3, 1893. Serial No. 468,931. (Specimens.)

*To all whom it may concern:*

Be it known that I, GARDNER HEWETT, of the city, county, and State of New York, have invented a new and useful Improvement in Depolarizers for Voltaic Cells, of which the following is a specification.

My invention consists in a depolarizer for voltaic cells, which is prepared and supplied to the market in the form of a dry powder which is prepared for use by solution in water.

The object of my invention is to do away with the handling and employment of the powerful and corrosive nitric and sulphuric acids which are used for this purpose, ordinarily in liquid form, and to substitute a powder which is free from the objections incident to handling the above-named materials or materials of similar nature and which is very efficient for the purpose named.

I prepare the powder in the following manner: I mix together one part of nitric acid and three parts of sulphuric acid. I then combine equal parts of this mixture and bichromate of sodium. The acids are heated so as to effect prompt solution of the bichromate. When the solution is cooled, it solidifies into a solid mass which can be ground up in any suitable way to produce a powder. This powder is easily handled, is free from acid or corrosive fumes, and is adapted for immediate use by simple solution in water in the proportion of about four pounds of powder to a gallon of water.

I have found this compound to be an exceedingly efficient and powerful depolarizer. I propose to supply my powder as aforesaid to the market as a new article of manufacture and sale.

I claim—

As a new article of manufacture, a depolarizer for voltaic cells consisting of nitric acid, sulphuric acid and bichromate of sodium, in the form of a dry powder, substantially as described.

GARDNER HEWETT.

Witnesses:
H. R. MOLLER,
M. BOSCH.